INVENTORS,
MAC BLACKMAN
JACQUES TRAUBE
BY
ATTORNEY

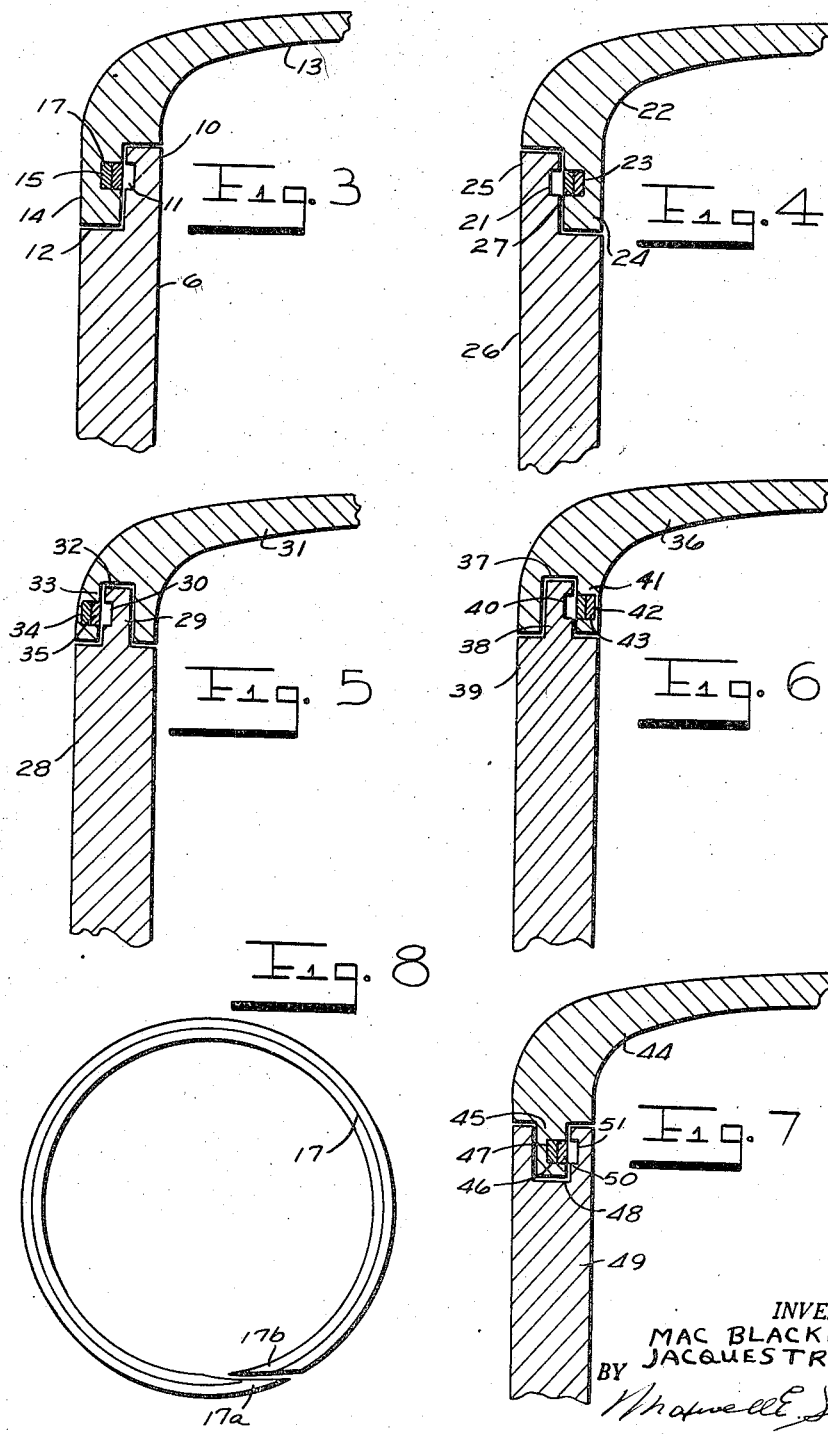

Patented May 11, 1948

2,441,131

UNITED STATES PATENT OFFICE 2,441,131

CLOSED VESSEL WITH SELF-LOCKING MEANS

Mac Blackman, Easton, Pa., and Jacques Traube, New York, N. Y.; said Blackman assignor to said Traube Application May 28, 1946, Serial No. 672,788

1 Claim. (Cl. 220—61)

This invention relates to closed vessels with self-locking means, and one of its objects is to provide a closed vessel, such as, a pressure cooker with means for locking the cover to the body of the vessel which will operate with the rise of temperature resulting from placing the closed vessel over a heat source, and which will automatically release the cover when the closed vessel has been withdrawn from the heat source, or the heat source has been extinguished, when the temperature of the cover or the body of the vessel naturally falls to a lower level.

Another object of the invention is to provide a vessel with a cover having overlapping engagement with a coupling rim formed on the body of the vessel, and a thermo responsive coupling element which is adapted to lock the cover to the rim when the temperature of the vessel is increased by the influence of heat applied to it.

A further object of the invention is the provision of the vessel with a coupling rim having a groove in one side thereof, and a cover having a flange arranged to have overlapping engagement with the rim, and provided with a ring which is adapted to expand or contract as the case may be under the influence of heat applied to the vessel, so as to project into the groove of the coupling rim and positively lock the cover to the vessel, when the ring is expanded or contracted by the influence of heat, and which will contract or expand when the vessel is no more exposed to the influence of heat.

With the above and other objects in view the invention comprises certain new and useful constructions, combinations, and arrangements of parts, clearly described in the following specification, and fully illustrated in the drawings, in which—

Fig. 3 is a detail vertical sectional view, enlarged, showing the cover locking means.

Fig. 4 is a similar view, showing a modified cover locking means.

Fig. 5 is a similar view showing another modified locking means.

Fig. 6 is a similar view showing still another modified locking means.

Fig. 7 is a similar view showing another modified locking means.

Fig. 8 is a plan view of a split heat expanded locking ring.

Figure 1:
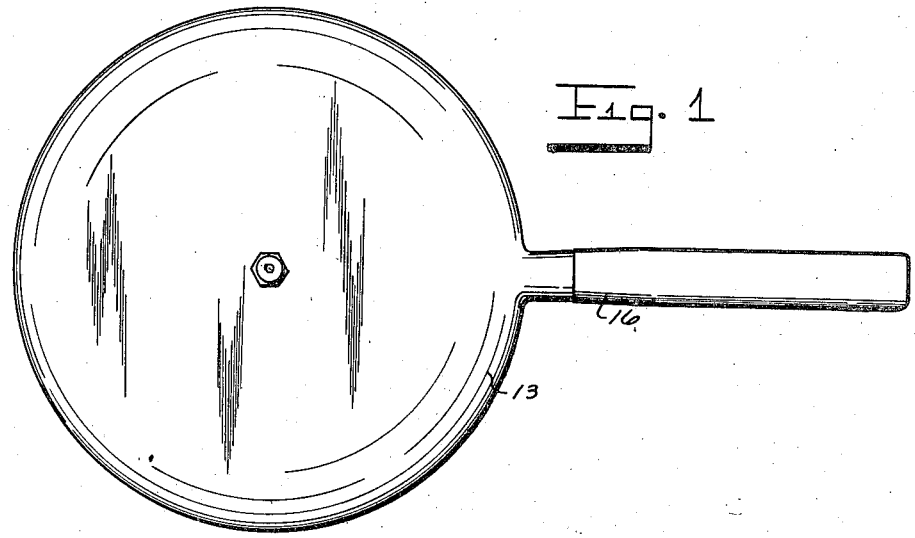
Fig. 1 is a top plan view of a pressure cooker embodying the invention.

Referring to the drawings which illustrate the practical embodiment of the invention, 5 designates a vessel in which food is to be cooked, and which is provided with the usual enclosing wall 6 and bottom 7. A handle 8 is rigidly connected with the wall 6 by means of the integral or cast stud 9.

The upper edge portion of the wall 6 is formed with a coupling rim 10, which is not as thick as the wall 6. This rim is formed with a groove 11, which extends over the entire body of the rim. Due to the fact that the coupling rim 10 has a thickness considerably less than that of the wall 6 a shoulder 12 is formed at the base of the coupling rim.

A cover 13 is constructed with a marginal rim 14, which is adapted to have overlapping engagement with the coupling rim 10, and this rim is formed with an internal groove 15, designed to register with the groove 11. A handle 16 is rigidly connected with the cover 13.

In the internal groove 15 of the cover a split ring 17 is disposed. This ring is formed with terminal portions 17a and 17b, which may have sliding overlapping engagement with each other, and which may form cooperating wedges when one of said terminal portions is caused to slide under pressure against the other terminal portion by expansion or contraction of the bimetallic ring.

This expansion or contraction of the ring takes place when the pressure cooker is exposed to the influence of heat and the temperature of the vessel and cover are raised to about 190 degrees F.

The vessel is supplied with the food to be cooked, the cover is placed on the vessel, in the usual manner, and the pressure cooker is then placed over a gas flame or other source of heat. When the influence of the heat raises the temperature of the pressure cooker to about 190 degrees F., which is below the boiling point of water, the split locking ring will expand or contract, as a result of its own expansion or contraction against the non-yielding rim of the cover. In Figs. 3, 5 and 7, the metal of the outer element of the ring has the greater coefficient of linear expansion, and the ring will be forced partly into the groove 11 of the vessel rim 10 (Fig. 3.) When this takes place the cover will be effectively locked to the vessel. As the heat of the pressure cooker rises the contraction of the coupling and locking ring will increase, so that the cover will be more effectively locked to the vessel.

When the pressure cooker has been withdrawn from the source of heat, or the gas or electrical current which furnishes the heat is cut-off the split locking ring 17 will cool and expand, and as it expands it will retreat entirely from the groove 11 of the cover rim 10, thereby releasing the cover from the vessel.

My invention thus provides means for automatically locking and unlocking the cover of a pressure cooker, so that the housewife or other person in charge will be protected against both failure to lock the cover when cooking is started, and carelessness in unlocking the cover before the internal pressure of the cooker has dropped to zero.

This construction also allows the cover to remain unlocked during the period when the air in the vessel and cover is being expelled. When the temperature of the pressure cooker reaches the point when the coupling and locking ring 17 will expand to coupling or locking position, the cover will be locked and the free space within the vessel and the cover will be filled with water vapor, so that cooking may proceed with all free air expelled.

A conventional pressure or relief valve 20 is provided on the cover to vent any steam which reaches a pressure exceeding maximun lbs. per square inch, as may be predetermined by the manufacturer of the pressure cooker.

Figure 2:
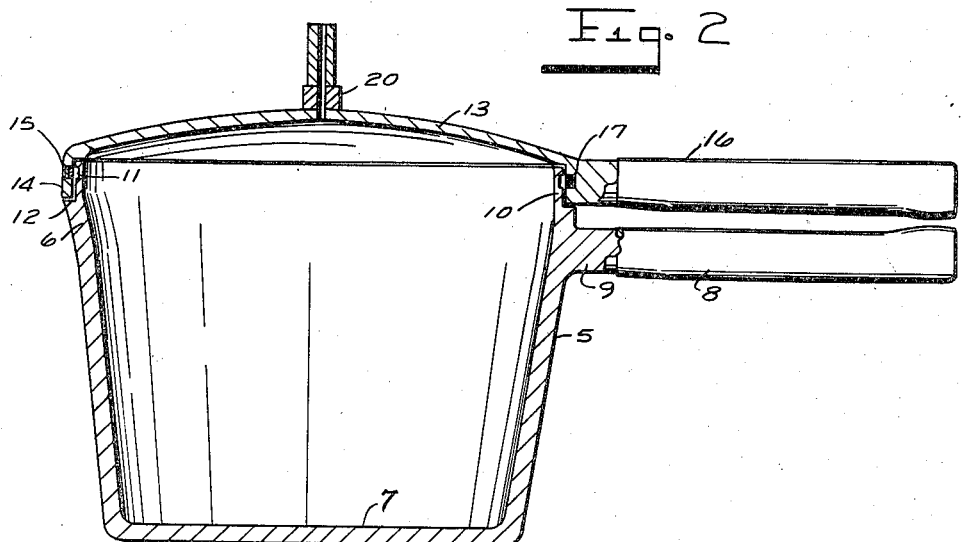
Fig. 2 is a vertical sectional view thereof.

In Figs. 2 and 3 the vessel rim is shown with an external groove, and the cover rim with an internal groove. In Fig. 4 a vessel is shown with an internal groove 21, and a cover rim 22 with an external groove 23. In this case the cover rim 24 fits in the upstanding rim 25 of the vessel 26, and the heat expandable locking ring 27 is carried by the cover rim 24. In Fig. 4 as well as Fig. 6, the metal of the inner element of the bimetallic ring has the greater coefficient of linear expansion.

In Fig. 5 a vessel wall 28 is shown with a coupling rim 29, located midway of the inner and outer faces of the wall 28. This rim 29 is formed with an external groove 30 and the cover 31 is formed with a groove 32 which receives the entire vessel rim 29. One wall 33 of this groove is provided with an internal groove 34, which receives the heat thermo-responsive locking ring 35.

In Fig. 6 a reverse construction is shown, wherein the cover 36 is formed with a groove 37 which receives the intermediate rim 38 of the vessel 39. The vessel rim 38 is formed with a groove 40 in its inner surface or side, and the side 41 of the cover is provided with an internal groove 42 which holds the thermo-responsive ring 43.

In Fig. 7 the cover 44 is provided with a coupling rim 45, having a groove 46 in its inner side, which receives the coupling ring 47. This rim 45 is adapted to fit into the groove 48 of the vessel wall 49, and a thermo-responsive ring 50 is disposed in the groove 46 and is adapted to extend into the groove 51 of the vessel wall 49.

The groove of the cover which receives the locking ring has sufficient depth to entirely receive this locking ring. The locking ring is constructed of two metals having different responses to heat and changes of temperature, and may be made of any well known thermostatic metal or combination of different metals.

These combinations may include copper and iron or copper and steel; brass and Monel metal; Monel metal and chromium alloyed iron or steel; stainless steel and iron; or any other suitable combination of unlike metals.

The coupling ring may be faced with Neoprene or any other suitable sealing element, so that leakage of steam through the engaging parts may be prevented. Any other type of leak preventing packing may be employed.

It is to be noted that in all of the figures (except Fig. 8, which only shows a form of thermo responsive split bimetal ring employable in the invention) the vessel has an upstanding wall of reduced thickness with a groove in one side thereof, and the cover has a downwardly extending wall adapted to overlap the groove and has a groove adapted to register with the groove in the upstanding wall of the vessel.

Although the invention has been described with reference to a pressure cooker, it is understood that it is applicable to vessel and cover in general, where the same is subjected to the influence of heat; and is further applicable to devices subjected to heat wherein it is desired to lock one element or part to another element or part.

It is thus seen that the present invention comprises simple and practical self-locking means, which will be safe, efficient and reliable in use and operation; and which may be inexpensively manufactured and assembled and which is well adapted to accomplish, among others, all of the objects and advantages herein set forth.

Without further analysis the foregoing will so fully reveal the gist of the invention that others can by applying current knowledge readily adapt it for various applications without omitting certain features that from the standpoint of the prior art fairly constitute essential characteristics of the generic or specific aspects of this invention, and, therefore, such adaptations should and are intended to be comprehended within the meaning and range of equivalency of the following claim.

Having described the invention, it is claimed:

A pressure cooker having a vessel provided with an upstanding wall of reduced thickness having a groove in one side thereof, a cover having a downwardly extending wall adapted to overlap the groove and provided with a groove adapted to register with the groove of the said upstanding wall, and a thermo-responsive split bimetal ring disposed in one of said grooves and normally entirely received thereby and adapted to be forced by the heating of the vessel to partially enter the other groove and lock the cover to the vessel wall.

MAC BLACKMAN.
JACQUES TRAUBE.

REFERENCES CITED

The following references are of record in the file of this patent:

UNITED STATES PATENTS

| Number | Name | Date |
| --- | --- | --- |
| 1,137,085 | Riddle | Apr. 27, 1915 |
| 1,326,124 | Vischer, Jr. | Dec. 23, 1919 |
| 1,681,150 | Vischer, Jr. | Aug. 14, 1928 |
| 1,734,236 | Smith et al. | Nov. 5, 1929 |
| 2,125,419 | Birk | Aug. 2, 1938 |
| 2,250,045 | Focke et al. | July 22, 1941 |
| 2,325,189 | McCollum | July 27, 1943 |
| 2,325,298 | Barnes | July 27, 1943 |
| 2,390,445 | Mercier | Dec. 4, 1945 |